Nov. 12, 1957  F. FRUENGEL  2,813,230
VELOCITY-DEPENDENT MEASURING AND CONTROL SYSTEMS
Filed Jan. 8, 1954  3 Sheets-Sheet 1
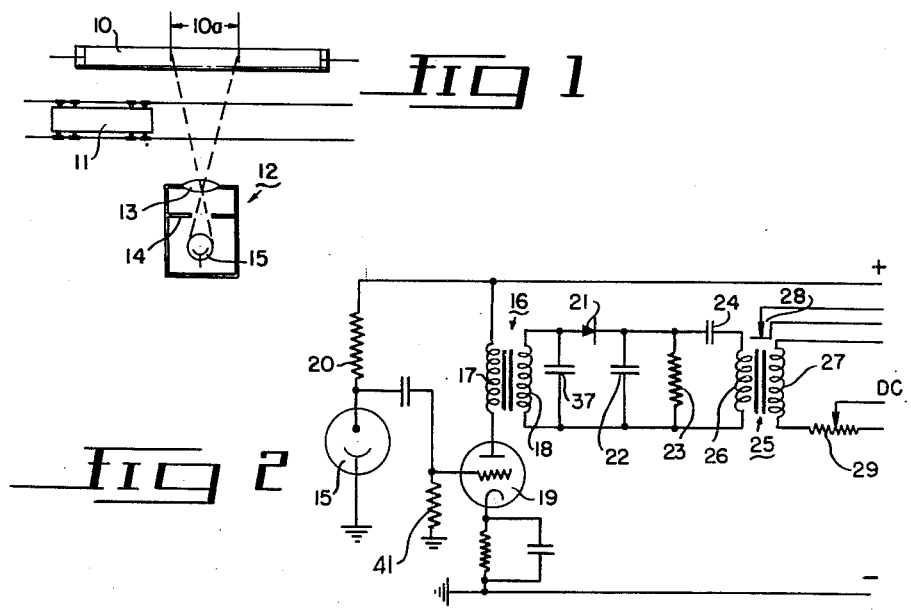
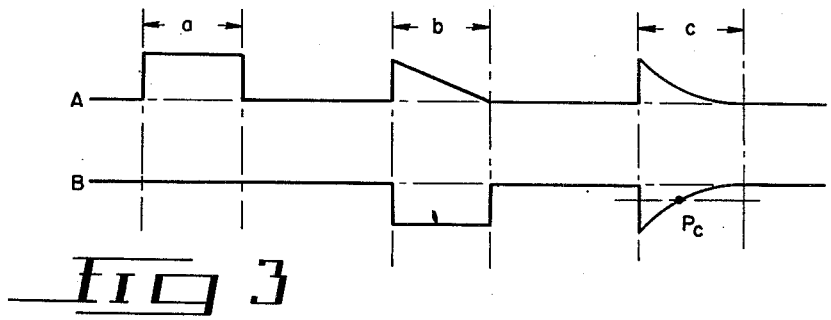
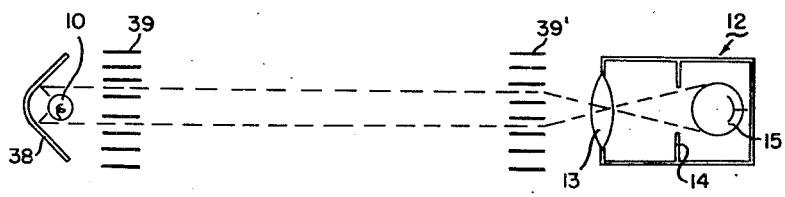
INVENTOR.
Frank Fruengel
BY William H. Kumer
AGENT

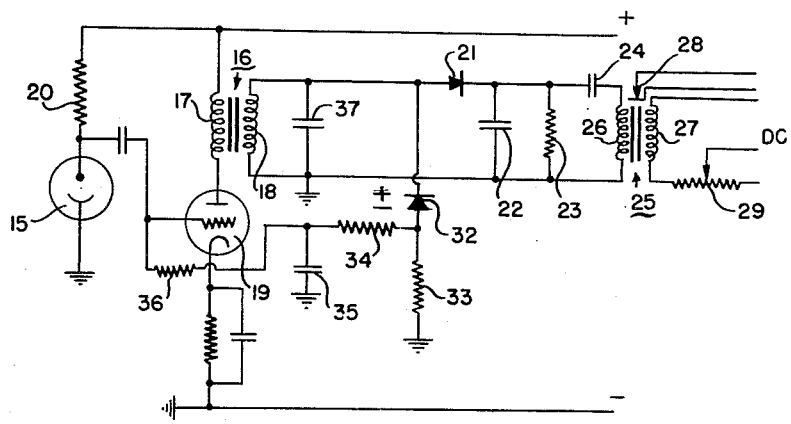
_Fig 5_
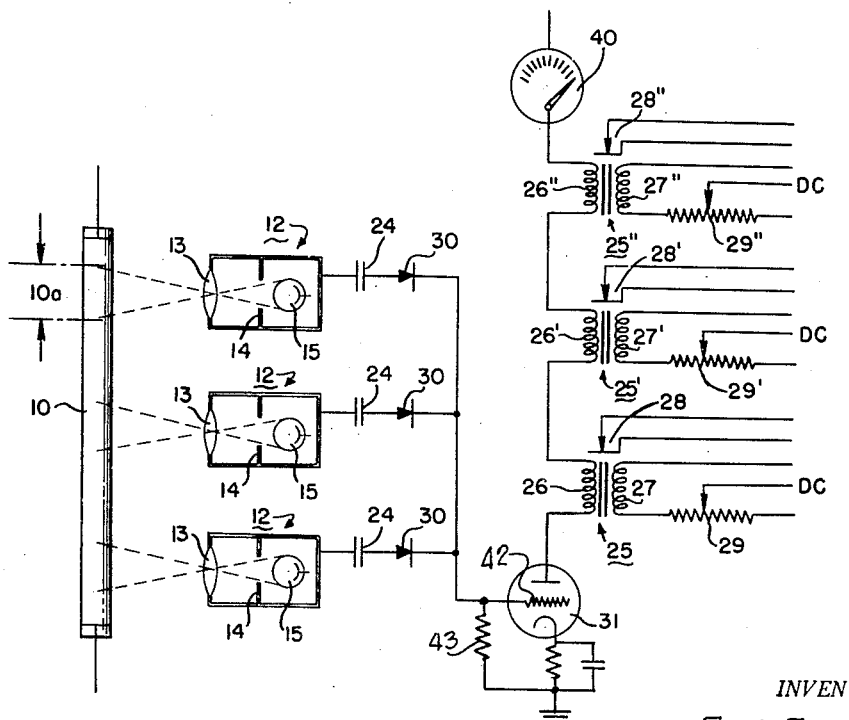
_Fig 7_
INVENTOR.
Frank Fruengel
BY William H. Kuner
AGENT

United States Patent Office 2,813,230
Patented Nov. 12, 1957

2,813,230

VELOCITY-DEPENDENT MEASURING AND CONTROL SYSTEMS

Frank Fruengel, Hamburg-Rissen, Germany

Application January 8, 1954, Serial No. 403,021

9 Claims. (Cl. 317—130)

This invention relates to control means and more particularly to a control system by means of which instantaneous velocities of not uniformly moving bodies can be measured, or a decelerating body, when reaching a predetermined velocity in its slowing-down motion, is able to give a signal or to initiate a feedback control action which affects its subsequent motion by actuating a brake or by causing other control means to assume action at the instant the point of proper velocity has been reached.

It is a primary object of this invention to provide a velocity-dependent signal or control system which will render an observable signal or initiate a control action at the exact instant at which a decelerating body reaches a predetermined velocity; or which will indicate instantaneous velocities of the body at successive points on its path of travel.

The well-known method for measuring the speed of a body, which consists in erecting two light barriers in spaced relation at a certain point on the path of its travel and letting the body by its shadow effect initiate two signals in time spacing for figuring the velocity at this particular point, cannot be employed for finding the point at which a predetermined velocity has been reached, unless a multitude of such barriers with appertaining recording devices is installed.

Another more elegant but also more elaborate method which has been disclosed utilizes the acoustic or electromagnetic Doppler effect, whereby a sound or a beam of another radiant energy of a certain frequency is focused upon the moving body in its axis of movement or parallel thereto, and the frequency of reflected echo is superposed upon the radiated frequency, resulting in the Doppler effect serving as a measure for the speed of the body. But also this method can only be applied when the moving body whose velocity is to be determined presents suitable reflex surfaces. This, however, is seldom the case. Furthermore, this method, while giving reliable results under favorable conditions, is rather complicated and not suitable for rough practical use. It can only be applied if the bodies, whose velocity is to be measured, are all of uniform shape and have uniform reflex properties. The results obtained are erratic whenever bodies of varying contour and length are concerned. Such bodies of varying shape, however, are generally encountered in practical fields in which speed measuring is of importance. A typical field is that of railroading which may serve for further illustration. Here railroad cars are the moving bodies which at first sight appear to be of uniform configuration, but which actually vary considerably particularly in the contour of their sides and in their lengths, and there may be more cars coupled together. Thus the method making use of the Doppler effect cannot be applied.

An essential problem in railroading is the control of rail brakes whereby it is important to release the brake immediately after the speed of the car entering the brake has been decelerated to a predetermined value, say to a speed of 3 meters per second, so that the car can proceed at this slow speed thereafter. Although it is possible to measure the speed of the car at the instant it enters the brake by means of light barriers mentioned above, it is very difficult to solve the problem of giving a signal or actuate a feedback control at the instant a predetermined lower speed value is reached, because there is, most likely, no measuring device located just at that casual point. The only way to obtain the desired result would be to arrange a great number of measuring points along the path of travel and apply just as many time measuring devices, then the device in whose range the desired speed value is reached could initiate the signal or control. Such installation, however, are too complicated for rough service; moreover, they require continual time-wasting maintenance. Their first cost and the cost of servicing are too high in view of limited savings in operation, which generally consist in elimination of one operator. On the other hand, to satisfy the requirements of practical service, speed control devices must work very accurately, i. e., they must take action within one to two percent of the desired velocity value.

Realizing the shortcomings of present velocity measuring methods, it is a further object of this invention to provide a system which is of simple arrangement, reliable in operation, and capable of rendering more accurate results than hitherto could be obtained.

To achieve the objects in view, the present invention includes a track or path along which the body whose velocity is to be measured is traveling, an elongated light source of modulated light extending on one side of said path throughout the whole length of a measuring distance thereon, and at least one light signal receiving device on the other side of said measuring distance. Thus the light from the light source incident on the receiving device is intercepted by a moving body passing the measuring distance on the path. The light signal receiver includes an optical system, a photo-sensitive device preferably in the form of a photo-tube, an amplifier for the current pulses passed by the photo-tube, and a differentiating network with an interposed energizing winding of a relay being effective in closing a separate control-actuating circuit. The differentiating network is preferably coupled to the amplifier output by a transformer having a rectifier and a storage condenser connected in series to its secondary, whereby the condenser is paralleled by a resistor which in turn is bridged by a blocking condenser in series with the energizing winding of the relay. Thus the storage condenser is continually charged through the transformer with amplified photoelectric energy and is discharged through the paralleled resistor producing a constant voltage drop or potential across the latter as long as modulated light of constant intensity impinges upon the photo-tube. Under this normal condition there exists also a constant potential at the blocking condenser and no current can flow through the energizing winding of the relay. When, however, a shading effect in the path of the modulated-light beam is caused by an intercepting moving body on the measuring distance, the potential on the storage condenser and across the resistor will drop giving rise to a displacement current through the blocking condenser and the energizing winding of the relay, which current will be proportional to the magnitude of shading, i. e., to the velocity of the passing body. The relay is preferably of the differential type having, besides the energizing winding connected in series with said blocking condenser, a second winding continuously energized from a D.-C. source whose current can be adjusted for setting the point, corresponding to a predetermined velocity of the moving body, at which counter-action of the displacement current in the first winding will actuate the relay.

In applications requiring several light receivers, the output of all differentiating networks may be preferably connected, each through a separate rectifier, to a common relay through an electronic valve, whereby the relay can be actuated from any one of the receivers whose phototube is caused to pass current of a magnitude for which the relay is set. This setting, as already referred to, is in accordance with the affection of any of the phototubes by the moving body just at the instant its deceleration within the measuring distance reaches a velocity at which feedback control is expected to take place.

In order to render the system substantially insensitive to variations in the intensity of the modulated light emanating from the light source, this invention provides an automatic grid control for the amplifier tube in the receiver working according to a principle known in itself, whereby a small fraction of the current passed by the phototube is branched off through an auxiliary circuit causing as final result a control potential at the grid of the amplifier tube tending to minimize in the receiver the effects of light intensity variations.

To secure the whole benefit of the control system according to this invention without an unduly high amplification ratio, it is advisable to take steps for increasing the optical efficiency by arranging the modulated-light source in a parabolic reflector and by employing suitable masking means in the light path to render the light system directional and to keep out extraneous light. Moreover, it is advisable to apply fluorescent materials as coating for the lamp that have little phosphorescence and can follow readily the cyclic frequency changes so that a pronounced degree of modulation is obtained; and, in order to reduce the affection of the system by daylight, it is advisable to operate with light differing in its color temperature considerably from the color temperature of plain daylight, and to select a phototube that is particularly sensitive to light of this color temperature.

For a more complete understanding of aforesaid features and of the entire scope of this invention, a detailed description of some preferred embodiments is now to follow, which is to be read in connection with the accompanying drawings, in which—

Fig. 1 is a diagrammatic plan view of the arrangement of the system devices on both sides of a measuring distance;

Fig. 2 shows an electric network of a light receiver unit in its simplest form;

Fig. 3 shows graphically the relationship between the voltage potential created by the phototube and the displacement current as output of the differentiating circuit;

Fig. 5 shows a network incorporating the automatic grid control circuit for minimizing in the light receiver influences of light intensity variations of the modulated light source;

Fig. 6 is a diagrammatic showing of the masking means;

Fig. 7 shows several relays in the output circuit.

Figure 4:
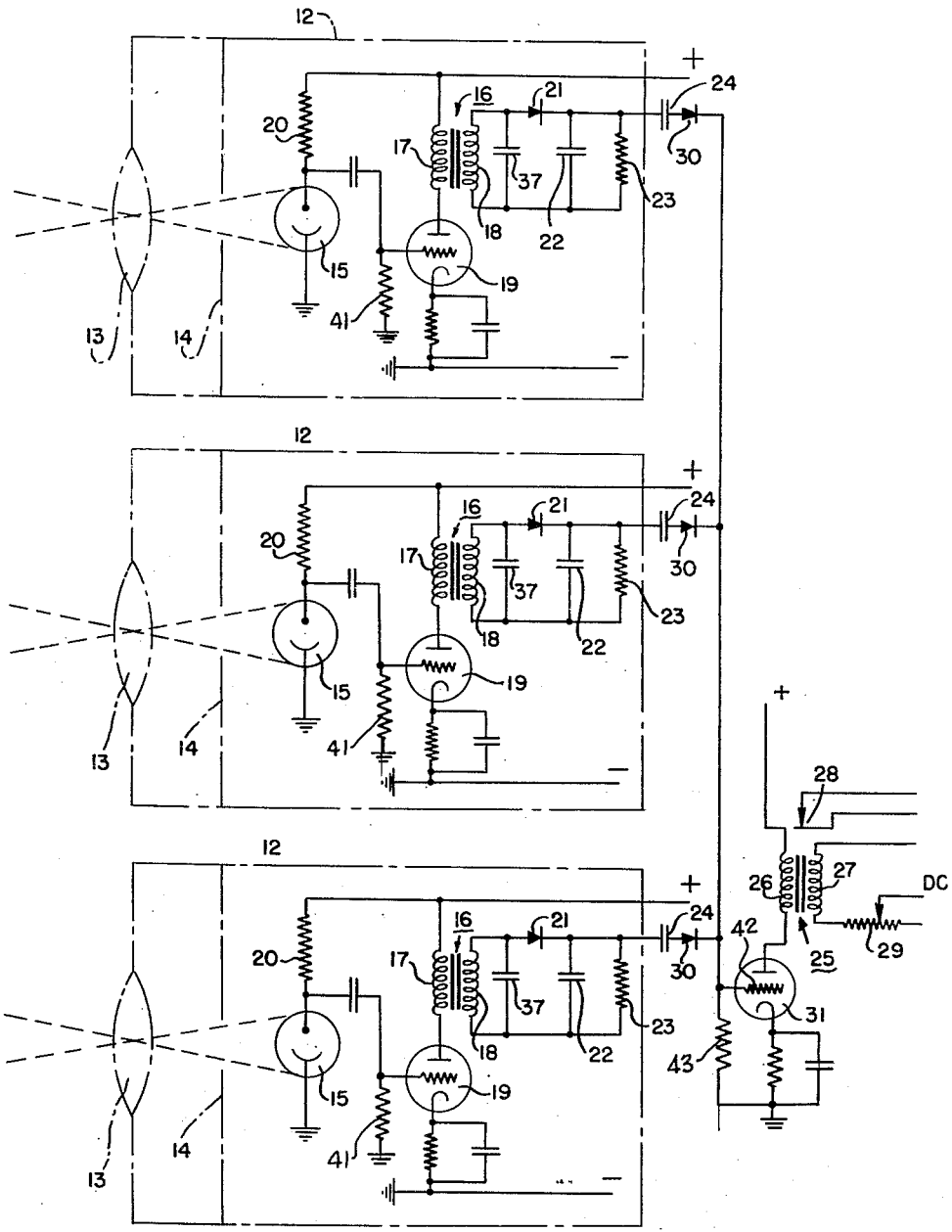
Fig. 4 is a network of a combination of three light receiver units.

Referring to Figure 1 of the drawing, there is shown a fluorescent lamp or other elongated modulated light source 10 adapted to be fed with current of comparatively high frequency which enables the lamp to emit modulated light. The frequency, as will be exclaimed more fully hereinafter, must be properly related to the range of velocities within which the control system shall operate. Reference numeral 11 indicates generally a railroad car or other body moving along a path at one side of the elongated light source. At the side of the path opposite to the light source there can be seen a light receiving device generally indicated at 12 and comprising a lens 13, an intermediate diaphragm 14, and a phototube 15. The optical relation between a certain length of the lamp and the diaphragm aperture is thereby selected that the margins of this length in the picture of the light source 10 behind lens 13 coincide with the limits of the diaphragm 14, which, for instance, may represent a distance value of one meter. The length under consideration is indicated on the light source 10 as distance 10a. The phototube 15 is connected to operate in a vacuum-tube network according to Fig. 2. In this network, including amplifier tube 19 and grid leak resistor 41, the current pulses developed by the modulated light incident on the phototube are amplified and presented to the primary winding 17 of transformer 16. Connected to the secondary 18 of transformer 16 is a differentiating circuit which can take various forms, one preferred form, included in the network of Fig. 2, will now be described.

In this circuit a storage condenser 22 is charged by the current pulses delivered by the secondary 18 of transformer 16 by way of rectifier 21, and is continuously discharged through a resistor 23. As long as modulated light of constant intensity impinges on phototube 15 and the constant voltage developed thereby is presented to transformer 16, there exists a constant voltage drop or potential across resistor 23. Resistor 23 is bridged by a series circuit comprising one energizing winding 26 of a relay 25 and a blocking condenser 24. Owing to the blocking effect of condenser 24, no current can flow through the energizing winding 26 so long as constant potential prevails across resistor 23. However, at the instant the modulated light incident on phototube 15 is subdued, which may be caused by a moving body passing the measuring distance 10a on the path and intercepting the light beam, the potential across resistor 23 drops and a displacement current flows through condenser 24 and the energizing winding 26 of relay 25. For a reason to become apparent hereinafter, relay 25 is preferably of the biased differential type in which a second energizing winding 27, fed by an adjustable but otherwise constant direct current, counteracts to a certain predetermined extent the energizing effect of the displacement current permitted by blocking condenser 24 to flow through coil 26. The magnitude of displacement current is proportional to the shading effect and thus to the velocity of the moving body passing the measuring distance and subduing the light falling on the phototube, and can be utilized as a measurement for this velocity.

For a clearer understanding of the operating principle of the system, there is shown in Fig. 3 a graph in which the upper curve A, over a time axis, represents potential values across resistor 23 as influenced by changes of effective light intensity caused by a moving body passing the measuring distance 10a. The curve B, being substantially a differential curve of curve A, represents the displacement current values as they functionally change with the voltage values of curve A. The zero values of both curves apply when the system is not in operation. With the system in operation and no moving body passing the measuring distance, a constant modulated light value is incident on phototube 15 and a constant potential exists across resistor 23. This constant potential is indicated as an ordinate value of curve A during the time interval marked a. As will be understood, there flows no displacement current through blocking condenser 24 under this condition and the curve B indicates zero value just the same as when the system is inoperative. During the time interval marked b, a body passes the measuring distance at constant speed. The light on the phototube will gradually and uniformly dim down resulting in a uniform drop of potential on resistor 23 as indicated by curve A at b. The differential quotient of such uniformly descending curve is a constant negative value and is correspondingly indicated by curve B at this point. This is a true representation of the occurrence in the system because a uniformly decreasing potential on resistor 23 causes a constant displacement current through condenser 24 and the energizing winding 26 of relay 25. This current will instantly stop to flow when steady light conditions are reestablished, even then, when the moving body should come to a stop within the measuring distance and thus intercept the light completely. During the time interval marked c, a uniformly decelerating body passes the measuring distance. This occurence gives rise not to a uniform but to a gradually diminishing drop of potential across resistor 23 as readily noticeable from the slope of curve A at this point. Here the differential curve B indicates a gradually falling-off tendency representing a gradually decreasing displacement current through relay 25.

Remembering that relay 25 is biased by a constant direct current in a separate energizing winding 27, this current value is indicated as a dotted line through the end portion of curve B, it becomes evident that a point Pc will be obtained at which the decreasing displacement current just compensates the opposing D.-C. energizing effect on the relay. This is the point at which the relay, completely deenergized, will release its armature and thereby initiate the desired signal or control movement. By properly adjusting the magnitude of the direct current which in the network shown can be done by setting potentiometer 29, it can be achieved that this signal is given at just the desired velocity of the body under observation.

To apply the principle of this invention as just described more generally, it is only necessary to arrange several light receiving devices along the whole measuring distance represented by the fluorescent lamp 10; each one of these devices covering similar distances as the distance 10a (Fig. 1) adjacent to 10a, and each one adapted to control its relay. If now in one of these devices the relay is actuated as result of equilibrium between the D.-C. biasing current and the displacement current, in turn caused by a decelerating, light-intercepting body, it is here where the desired velocity of the body is reached.

For practical use it is advantageous to employ a simplified network as provided by this invention and as illustrated in Fig. 4. Here three light receiving devices, of which only the phototubes 15 are shown, are connected in the network. The amplifying stages with vacuum tubes 19, the transformers 16, the rectifiers 21, condensers 22, and resistors 23 of these devices are similarly arranged as in the receiving network shown in Fig. 2. The blocking condensers 24 of these receivers, however, which may also be termed differentiating condensers since they effect the differentiating action in the circuit, are here not in series with the energizing winding of a relay but are connected in parallel, each one through a separate rectifier unit 30 as clearly shown in Fig. 4. It is to be understood that for the purpose in view any number of receivers, say 40 or more, can thus be paralleled. The common outlet of all rectifiers 30 is connected to the control electrode 42 of an electronic valve 31. In order to assure ready response to control potential fluctuations and to avoid a permanent charge on electrode 42, the latter is provided with a discharge connection to ground by way of resistor 43. The actuating relay 25 for initiating the signal or control is then interposed in the plate circuit of valve 31. This arrangement requires only one relay for several receivers because at the instant one of the several differentiating condensers 24 passes a current through its rectifier 30 and creates a certain biasing potential at the control electrode or grid of valve 31, a corresponding plate current will flow and, since the energizing winding 26 of relay 25 is in this circuit, a signal will be initiated whenever this current is of proper predetermined value. The actuating value of this current, or, in a broader sense, the velocity of the body under observation at which a signal or control should be given can be set by varying the resistance 29 in the counter-acting D.-C. winding 27 of relay 25, and this can be done by remote control if desirable.

In rough practical service it cannot be prevented that the optical and electrical constants of the system are affected by variations due to contamination, aging, or voltage fluctuations at the light source. Such variations in modulated light output unfortunately give rise to inaccuracies in the results. In order to avoid such inaccuracies as much as possible, this invention provides that the pulsating current developed in the phototube during unobstructed light incidence is utilized for automatic grid control of the amplifier tube 19. Such control can be obtained by applying principles, known in themselves, in a modified network as shown in Fig. 5. Similarly as in the network of Fig. 2, the current developed in phototube 15 causes a voltage drop in the anode resistor 20 of this tube, is amplified by amplifier tube 19, and by inductive coupling through transformer 16 reaches a circuit including condenser 37, which is preferably in resonance at a frequency substantially equal to the light frequency of the modulated light source. A fraction of the output of this circuit is branched off through an auxiliary rectifier 32 and resistor 33. Thus a potential drop occurs across resistor 33 which changes with variation of the light intensity impinging on the phototube, which changes in turn may be caused by supply voltage fluctuations at the light source, aging or contamination of the optical system. The potential across resistor 33, so created, is applied on a resistor-capacitor member 34—35. The time constant of this member or filter is comparatively great, for instance 100 seconds, and causes a negative control potential on condenser 35, which follows readily slow changes but not rapid changes of potential. This control potential becomes effective on the control grid of tube 19 by way of grid resistor 36. It will be understood that thus it is possible to control not only one but several amplifier tubes 19 if unfavorable optical conditions require more amplification. The modification of the receiver network just described lends the system some resemblance to automatic sensitivity- and volume-control circuits in radio receiver systems which, as well known, render uniform sound level even under extremely fluctuating field intensities received from the transmitter, and this owing to the fact that the entire amplifying section of the set regulates itself to a uniform initial potential level. In the present velocity-dependent system, this control measure cancels substantially all voltage fluctuation caused by variations in the volume of effective light incident on the phototube.

To enhance the optical efficiency of the system for the purpose of getting satisfying results without being compelled to apply high amplification, this invention provides preferred optical arrangements such as shown in Fig. 6 where the fluorescent lamp 10 is seen to be mounted at the focal axis of a parabolic reflector 38. In this case the whole surface of the reflector 38, when observed from the distance, for instance from the lens of the light receiving device, appears illuminated. Thus the effective light beam from lamp 10 is multiplied several fold. According to this invention it is furthermore advisable to insert in the light path suitable masking arrangements 39 comprising a number of spaced concentric collars making the system directional and keeping extraneous light and sun rays from reaching the reflector of lamp 10 but do not interfere with the light beam emanating from the lamp. A substantially similar masking arrangement 39' can preferably be secured in front of the lens of the receiver so that the lens 13 and diaphragm 14 are protected from unmodulated daylight.

In order to attain sufficiently accurate results, the working frequency of the fluorescent lamp 10 must be properly related to the range of velocities to be measured. If, for example, it is desirable to initiate the signaling or control impulse within a tolerance of 10 centimeters off the point at which the moving body reaches the preset velocity, care must be taken that during the interval that body needs for passing this distance, a sufficient number photocurrent pulses occur, for instance 10, and for higher accuracy, preferably 30. This is necessary because the charge of condenser 22 and thus the potential drop across resistor 23 depend on the rate of current pulses delivered, and a certain number must be intercepted before this potential decreases enough to cause an effective displacement current, capable of actuating relay 25, can flow. If, for instance, the speed of the decelerating body is 10 meters per second or 1000 centimeters per second, it will take 1/100 second to travel the 10 centimeters of the measuring distance within which relay action must take place. If the rate of at least 10 photocurrent pulses for this distance shall be maintained, the light frequency must be 1000 cycles per second, or, for higher accuracy, demanding 30 cycles for this distance, 3000 cycles per second. For practical purpose it is advisable to select a frequency for which a generating unit can be commercially obtained, for instance, a 800 cycle current converter which with two light peaks per cycle gives a light modulation of 1600 cycles per second. For more accurate work the selection of a still higher frequency becomes necessary.

In accordance with this invention it is further advisable to employ fluorescing materials as coating for lamp 10, which in their luminosity can readily follow the cyclic pulsations of the activating radiations of the A.-C. power frequency, because it is of disadvantage when the cyclic light fluctuations are materially subdued by undesirable afterglow, leaving only a small modulated light component. It is therefore advisable to employ as coating for the lamp fluorescent materials having practically no phosphorescence.

To further avert the influence through plain daylight, this invention proposes to use lamps giving light of a color that deviates considerably from the color of daylight. As well known, daylight has an average color temperature of about 600 degrees Kelvin. If now a blue-violet fluorescent coating is selected for the lamp, it is readily possible to attain apparent color temperatures of, say, 40,000 degrees Kelvin, which give great contrast against daylight and minimize its objectionable influence. When operating with a light source of blue-violet light, it is moreover advisable to arrange in front of the receiver lens or between lens and diaphragm a blue light filter which admits only light within this spectral region, whereas light belonging to the yellow, red, or green spectral range of the sun spectrum cannot pass. For maximum efficiency the phototube to be employed must be one whose maximum sensitivity lies within the blue-violet spectral range, preferably one having a cesium-antimony cathode.

The preferred embodiments of the present control system as hereinbefore described are limited to indication or feedback-control initiation at only one predetermined velocity of the object to be observed or controlled. However, by slight modifications in the output circuits, the system of this invention can be rendered suitable for continuous velocity control or for indicating successively the instant velocities of an object under control or observation. For this purpose it is only necessary to interpose in the output connection of each light-actuated device one, or in the anode circuit of the common electronic valve 31 several relays 25, 25', 25'', as indicated in Fig. 7. Each of these relays is adjusted so that it responds and closes its contact 28, which is interposed in an auxiliary circuit serving to actuate a control or indicator 40, at a different predetermined corresponding velocity. Thus it can be achieved that instantaneous velocities of a body under observation are indicated or registered at frequent intervals.

Such a modification of the invention is suitable for diversified applications, for instance, it can be employed in sporting activities, particularly races, where it makes possible to indicate instant speeds and top speeds of participants immediately to the forum.

It will be understood that other modifications can be made without departing from the spirit of this invention as disclosed and defined in the appended claims.

What I claim is:

1. A velocity-dependent control system comprising in combination, an elongated source of modulated light arranged on one side of a path of travel of a moving body and extending at least throughout the whole length of a predetermined measuring distance thereon, at least one light-actuated receiving device located at the opposite side of said path and positioned to receive light from said source, said receiving device including a lens, a diaphragm provided with an aperture, a light-sensitive device, circuit means, and a relay including an energizing winding, said aperture being of such size that the margins of the image of said light source projected by said lens onto said light-sensitive device coincide substantially with the limits of said measuring distance, said circuit means including photocurrent amplifying means, a coupling transformer having its primary connected to the output side of said amplifying means, a rectifier connected in series with the secondary of said transformer, a condenser and a resistor bridging in parallel said secondary and rectifier combination whereby to cause a constant voltage drop across said resistor so long as said condenser is continually charged by rectified voltage pulses of uniform amplitude but to cause a varying voltage drop when the amplitude of these pulses changes, connecting means including a blocking condenser to connect the energizing winding of said relay to the terminals of said resistor whereby to cause blocking of current flow through said energizing winding so long as the voltage drop across said resistor is constant but to cause a displacement current to flow through said energizing winding when the voltage drop varies, said displacement current being directly proportional to the rate of change of voltage drop across said resistor and thus to the rate of change of photocurrent and the rate of change in velocity of a body moving within the measuring distance, adjusting means for said relay adapted for setting the latter to become responsive only when energized by displacement current caused by a moving body attaining a predetermined velocity within the measuring distance.

2. A control system as claimed in claim 1 in which said source of modulated light comprises a fluorescent lamp having a fluorescent coating emitting light of a color temperature considerably higher than the color temperature of plain daylight and in which said light-sensitive device comprises a phototube being particularly sensitive to light of the color temperature emitted by said source.

3. A control system as in claim 1, wherein said modulated-light source comprises a fluorescent lamp having a fluorescent coating which renders little phosphorescing afterglow.

4. A control system as in claim 1, wherein said light source includes a parabolic reflector and masking means for rendering the light beam directional and for excluding extraneous light from reception by said receiving device.

5. A velocity-dependent control system comprising in combination an elongated source of modulated light arranged on one side of a path of travel of a moving body and extending at least throughout the whole length of a predetermined measuring distance thereon, a plurality of light-actuated receiving devices located in spaced relation along the opposite side of said path and each one positioned to receive light from an associated section of said source located across an associated section of said measuring distance, each receiving device including a light-sensitive device, a lens projecting an image of said associated section of the light source onto said light-sensitive device, a diaphragm provided with an aperture of such size that the margins of said image coincide substantially with the limits of said associated light-source section, circuit means, and a relay including an energizing winding, said circuit means of each receiving device including photocurrent amplifying means, a coupling transformer having its primary connected to the output side of said amplifying means, a rectifier connected in series with the secondary of said transformer, a condenser and a resistor bridging in parallel said secondary and rectifier combination whereby to cause a constant voltage drop across said resistor so long as said condenser is continually charged by rectified voltage pulses of uniform amplitude but to cause a varying voltage drop when the amplitude of these pulses changes, connecting means including a blocking condenser to connect the energizing winding of said relay to the terminals of said resistor whereby to cause blocking of current flow through said energizing winding so long as the voltage drop across said resistor is constant but to cause a displacement current to flow through said energizing winding when the voltage drop varies, said displacement current being directly proportional to the rate of change of voltage drop across said resistor and thus to the rate of change of photocurrent and the rate of change in velocity of a body moving within the section of said measuring distance associated with this particular receiving device, adjusting means for said relay adapted for setting the latter to become responsive only when energized by displacement current caused by a moving body attaining a predetermined velocity within the section of the measuring distance associated with the respective receiving device.

6. A velocity dependent system for automatic railroad-car retarders comprising in combination, an elongated modulated light source arranged along one side of a railroad track and extending at least throughout the whole length of a retarding distance thereon, a plurality of light-actuated receiving devices located in spaced relation along the opposite side of said retarding distance, means operative in limiting the view of each receiving device substantially to an associated section of said retarding distance and said light source, each receiving device including a light-sensitive device, electronic means for amplifying photocurrent pulses produced by said light-sensitive device under the action of modulated light received from the associated section of said light source, a coupling transformer having its primary connected to the output side of said amplifying means, a rectifier connected in series with the secondary of said transformer, a condenser and a resistor bridging in parallel said secondary and rectifier combination whereby to cause a constant voltage drop across said resistor so long as said condenser is continually charged by rectified voltage pulses of uniform amplitude but to cause a varying voltage drop when the amplitude of these pulses changes, a relay having an energizing winding, connecting means including a blocking condenser to connect said energizing winding to the terminals of said resistor whereby to cause blocking of current flow through said energizing winding so long as the voltage drop across said resistor is constant but to cause a condenser displacement current to flow through said energizing winding when the voltage drop varies, said displacement current being directly proportional to the rate of change of voltage drop across said resistor and thus to the rate of change of photocurrent and the rate of change in shading effect caused by a railroad car passing the associated section of said retarding distance at a decelerating rate of velocity, and adjusting means for said relay adapted for setting the latter to become responsive only when energized by displacement current caused by a railroad car attaining a predetermined velocity within the section of said retarding distance associated with the respective receiving device.

7. A velocity-dependent control system comprising in combination an elongated modulated light source arranged along one side of a path of travel of a moving body and extending substantially throughout the length of a predetermined measuring distance thereon, at least one light-actuated receiving device located at the opposite side of said path and positioned to receive light from said source, said receiving device comprising a photoelectric device, optical means for converging incident modulated light from the whole length of said source on said photoelectric device, a transformer, primary circuit means between said photoelectric device and the primary of said transformer including electronic amplifying means having at least one control grid and being operative in amplifying photocurrent pulses produced by said photoelectric device under the influence of modulated light incident from said source, secondary circuit means including a rectifier in series with the secondary of said transformer, a condenser and a resistor bridging in parallel said secondary and rectifier combination whereby to cause a constant voltage drop across said resistor so long as said condenser is continually charged by rectified voltage pulses of uniform amplitude but to cause a varying voltage drop when the amplitude of these pulses changes, a relay having a first and a second energizing winding, connecting means including a blocking condenser to connect said first energizing winding to the terminals of said resistor whereby to cause blocking of current flow through said first energizing winding so long as the voltage drop across said resistor is constant but to cause a displacement current to flow therethrough when the voltage drop varies, said displacement current being directly proportional to the rate of change of voltage drop across said resistor and thus to the rate of change of photocurrent and the rate of change in velocity of a moving body within the measuring distance, means for connecting the second energizing winding to a D. C. power source of controllable voltage to preenergize said relay and to render it responsive only when counter-energized by displacement current caused by a moving body attaining a predetermined velocity within the measuring distance, and auxiliary circuit means including a resistor-capacitor member arranged between said secondary circuit means and the grid of said electronic amplifying means adapted to effect a voltage bias at said grid for automatic compensation of slow variations in intensity of modulated light emitted by said source.

8. A velocity-dependent control system comprising in combination, an elongated source of modulated light arranged on one side of a path of travel of a moving body and extending at least throughout the whole length of a predetermined measuring distance thereon, a plurality of light-actuated receiving devices located along the opposite side of said path and each one positioned to receive light from an associated section of said source located across an associated section of said measuring distance, each receiving device including a phototube, a lens projecting an image of said associated section of said light source onto said phototube, a diaphragm provided with an aperture of such size that the margins of said image coincide substantially with the limits of said associated light source section, a transformer, primary circuit means between said phototube and the primary of said transformer including amplifying means operative in amplifying photocurrent pulses derived from said phototube under the influence of modulated light from the associated light source section and presenting them to the primary of said transformer, secondary circuit means including a rectifier in series with the secondary of said transformer, a condenser and a resistor bridging in parallel said secondary and rectifier combination whereby to cause a constant voltage drop across said resistor so long as said condenser is continually charged by rectified voltage pulses of uniform amplitude but to cause a varying voltage drop when the amplitude of these pulses changes, a common electronic control tube for all receiving devices having anode, cathode and control grid, connecting means between one terminal of said resistor of each receiving device and said control grid including each a blocking condenser and a rectifier, each blocking condenser preventing passing of a voltage bias from the resistor of the appertaining receiving device to said control grid so long as the voltage drop across said resistor is constant but allowing a displacement current to flow and to bias said grid when the voltage drop varies, an anode circuit for said control tube including a relay, adjusting means for said relay to render it responsive only when energized by an anode current corresponding to a grid bias caused by a rate of change of voltage drop across any one of said resistors produced under the influence of a moving body attaining a predetermined velocity within a section of the measuring distance associated with the receiving device including the particular resistor.

9. A system as in claim 8, in which a plurality of relays is interposed in the anode circuit of said electronic control tube, each relay having adjusting means adapted to be set for becoming responsive each at a different predetermined velocity attained by a moving body in the respective section of said measuring distance.

References Cited in the file of this patent

UNITED STATES PATENTS

| | | |
|---|---|---|
| 2,413,076 | Schick | Dec. 24, 1946 |
| 2,547,332 | Loveless et al. | Apr. 3, 1951 |